United States Patent [19]
Gregerson

[11] 3,757,868
[45] Sept. 11, 1973

[54] TRACTOR-IMPLEMENT HITCH CONTROL

[75] Inventor: Stanley Martin Gregerson, Cedar Falls, Iowa

[73] Assignee: Deere & Company, Moline, Ill.

[22] Filed: June 12, 1972

[21] Appl. No.: 261,697

[52] U.S. Cl. .................................. 172/9, 172/239
[51] Int. Cl. .......................................... A01b 63/112
[58] Field of Search ................... 172/7, 9, 10, 11, 172/239

[56] References Cited
UNITED STATES PATENTS

| | | | |
|---|---|---|---|
| 2,804,814 | 9/1957 | Czarnocki | 172/7 |
| 2,921,638 | 1/1960 | Du Shane | 172/9 |
| 2,946,392 | 7/1960 | Nelson | 172/7 |
| 3,422,906 | 1/1969 | Bunting et al. | 172/9 |

FOREIGN PATENTS OR APPLICATIONS

| | | | |
|---|---|---|---|
| 609,131 | 11/1960 | Canada | 172/7 |
| 882,425 | 11/1961 | Great Britain | 172/9 |

*Primary Examiner*—Robert E. Pulfrey
*Assistant Examiner*—Paul T. Sewell
*Attorney*—H. Vincent Harsha et al.

[57] ABSTRACT

A hitch control of the type wherein the working depth of the implement depends upon the draft between the tractor and implement, with provision for draft-sensing in both "positive" and "negative" phases and featuring means for locking out negative sensing when the implement is in its raised or transport position.

10 Claims, 5 Drawing Figures

FIG. 1
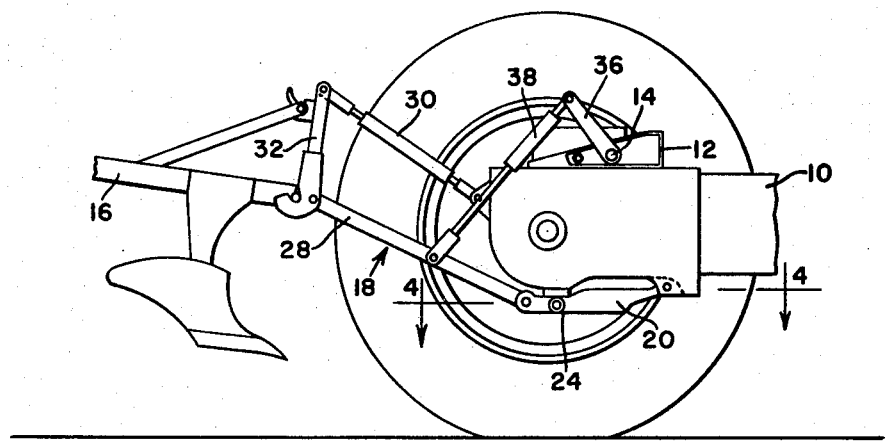
FIG. 2
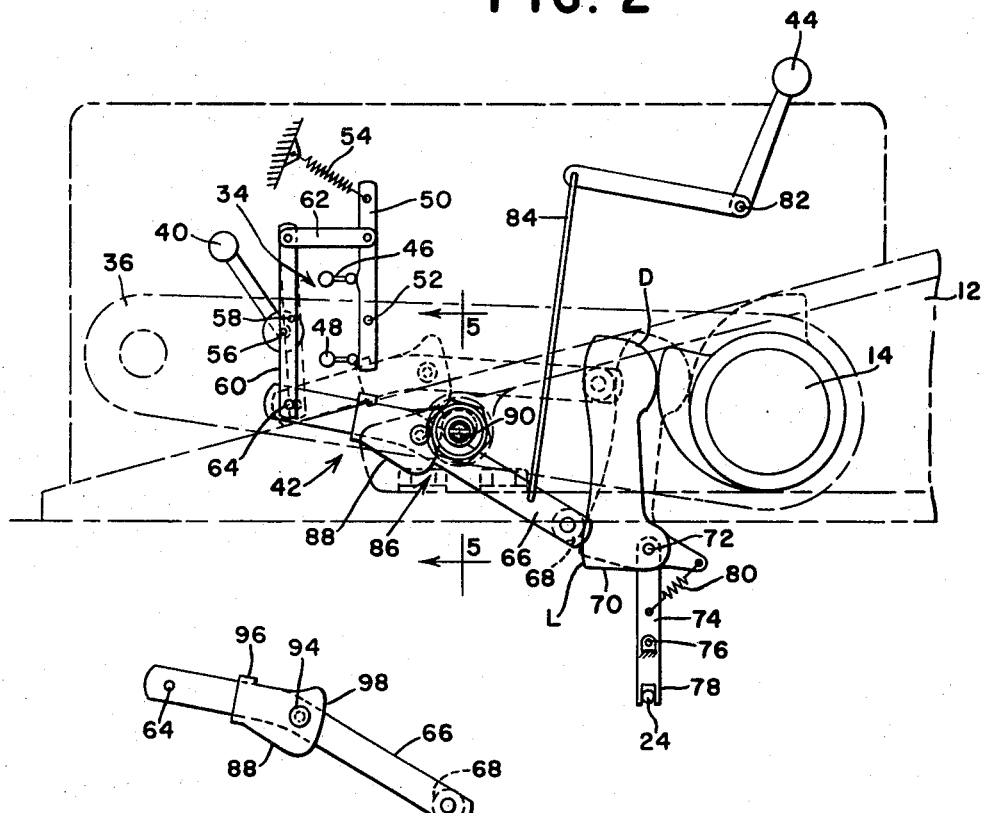
FIG. 3

TRACTOR-IMPLEMENT HITCH CONTROL

BACKGROUND OF THE INVENTION

The basic draft control system employed a three-point hitch in which draft forces were transmitted to the hydraulic system via the top link in compression. This is probably best exemplified in U.S. Pat. No. 2,118,180 to Ferguson, issued May 24, 1938. A later development recognized that the top link was also subjected to tensional forces, especially with long, heavy implements, and the reaction to tensional forces was exploited to obtain what has become referred to as "negative" sensing, distinguished from the "positive" sensing resulting from compression forces in the top link. See, for example, U.S. Pat. No. 2,437,875 to Chambers et al., issued Mar. 16, 1948. A further development grew out of the design featured by U.S. Pat. No. 2,940,530 to Du Shane, issued June 14, 1960, wherein the draft "signal" was derived from tensional forces in the lower links, giving "positive" sensing; although, it was learned that compressional forces could occur in the lower links, resulting in "negative" sensing.

The basic concept in any event was to feed the draft signal to a valve for activating and deactivating a hydraulic motor for adjusting the hitch, and thus the implement, as to height, the implement position being therefore a direct function of draft load. Later systems employed a combination of draft control (as just described) and "position" control; i.e., a control in which the implement and hitch height was dependent in whole or in part, according to the selection made by the operator, upon the position of the operator's hand lever, obtained by means of any conventional servo or follow-up linkage. See U.S. Pat. No. 2,921,638 to Du Shane, issued Jan. 19, 1960.

In a hitch and control system using or making provision for negative sensing, a problem occurs when the implement is raised clear of the ground, because the weight of the implement, acting through either the top link in tension or the bottom links in compression, tends to feed a "signal" to the hydraulic control which in turn tends to react by lowering the implement, which is of course undesirable. One prior art means of combating this is to provide external stops on the tractor so that the draft control spring or its equivalent cannot yield beyond a predetermined amount in the "negative" direction, but this has given rise to the further problem that the forces imposed on the stops are of substantial magnitude and soon destroy the stops, besides which the stops are difficult to adjust and cannot be easily retained in adjusted position. Attempts have also been made to provide some form of stop means internally of the control housing and operative on the control linkage where the forces are minimal, but these have not been successful because the stop is effective during the "position" control setting of the system rather than just during the "load" setting, causing the stop to become an interference with efficient operation of the system during position or depth control.

SUMMARY OF THE INVENTION

According to the present invention, a negative sensing lockout means is provided internally of the control housing and capable of being effective only during the draft setting. Specifically, this is achieved by selecting an input or servo link that, in its draft setting, cooperates with the stop means and that, in its depth or position setting, clears the stop means. A further feature resides in provision for adjustment of the relationship of the stops, one on the link and the other on a fixed part of the tractor housing structure. Moreover, the housing-mounted stop is easily adjusted from exteriorly of the housing, making adjustment simple, especially in conjunction with means for retaining the setting once selected.

BRIEF DESCRIPTION OF THE DRAWINGS

FIG. 1 is a partial side elevation of the rear portion of a tractor-implement outfit, showing a typical plow in raised or transport position.

FIG. 2 is an enlarged view of the interior portion of the basic servo control and power unit, with associated housing portions in broken lines, the parts reflecting a fully lowered position of the implement and the servo means being in its "load" or "draft" position.

FIG. 3 is a side view of the servo link to which the present stop means is applied.

DESCRIPTION OF A PREFERRED EMBODIMENT

Figure 4:
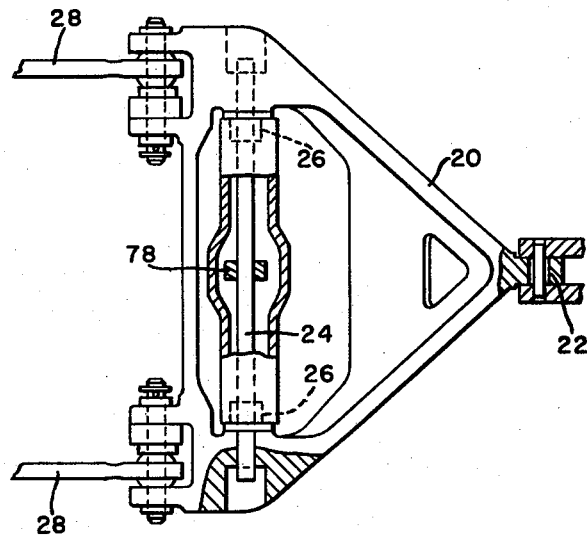
FIG. 4 is a section, on a scale enlarged over that of FIG. 1, on the line 4—4 of FIG. 1.
Figure 5:
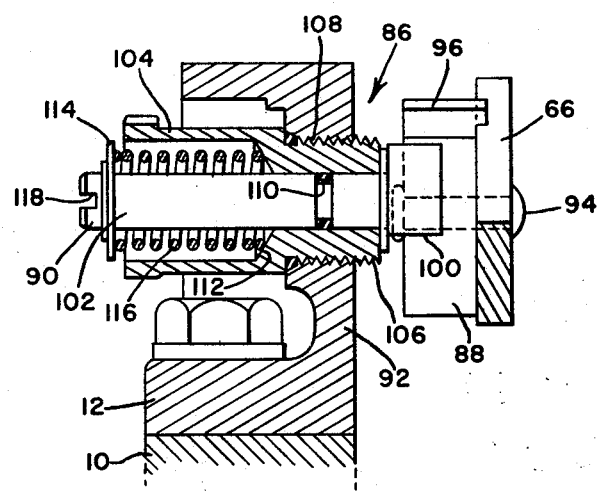
FIG. 5 is an enlarged section taken generally along the line 5—5 of FIG. 2.

In the interests of clarity and simplicity, the present basic disclosure follows generally those of above U.S. Pat. Nos. 2,921,638 and 2,940,530; although, this by no means limits the invention. A tractor having a body 10 including an upper, rear housing structure 12 in which a lift rockshaft 14 is rockable, has connected trailingly thereto an implement such as a plow 16. Hitch means, indicated in its entirety at 18, connects the implement to the tractor for both vertical adjustment and for limited fore-and-aft movement in response to changes in draft forces.

The hitch means includes an A-frame 20 having a forward sliding connection 22 with the underside of the tractor body. The rear legs of the A-frame are supported by opposite ends of a transverse resilient member or bar 24, preferably of the type forming the subject matter of above U.S. Pat. No. 2,940,530. Each end portion of the bar, short of its terminal end, is supported by a tractor-carried bushing 26 which forms a fulcrum, and the mid-portion of the bar is free to deflect fore-and-aft as draft forces are applied to the A-frame by lower draft links 28 which, together with a top link 30, are connected to an implement coupler 32 which is in turn connected to the plow 16. As will be clear from the last-mentioned patent above, increased draft forces on the implement will tension the draft links 28, causing a rearward shifting of the A-frame as opposed by the resilient bar 24, which bar tends to have its mid-portion deflected forwardly.

The forward deflection of the mid-portion of the bar operates to feed an "input signal" to the control means, here a valve means generally indicated at 34, for controlling the power unit, such as a hydraulic motor (not shown) operative to rock the rockshaft 14 which in turn, through a pair of lift arms 36, raises and lowers the hitch means, and thus the implement, by means of a pair of lift links 38. Forward deflection of the mid-portion of the bar 24 reflects "positive" sensing; i.e., tensional forces in the draft links 28. In some instances, "negative" sensing will occur, as when the lower links are placed in compression, especially in the cases of extra long implements, or when the tractor passes over a ridge and the implement tends temporarily to run out of the ground, thus finding itself without support from the ground. In cases of this type, compression forces in the lower draft links move the A-frame forwardly against the resistance imposed by the bar 24, deflecting the ends of the bar forwardly and followed by rearward deflection of the mid-portion of the bar.

In the present disclosure, the valve means 34 is capable of being fed by three "inputs"; namely, by a hand lever 40, the rockshaft 14 and deflection of the draft or load-control bar 24. A servo means, designated generally by the numeral 42, coordinates these inputs or signals, and means such as second hand lever 44 is provided for selecting between the rockshaft and the load-control bar as to which signal, as between these two, will predominate. It is possible, according to U.S. Pat. No. 2,921,638, mentioned above, to "mix" the rockshaft and load-control signals, but that feature is not important to an understanding of the present invention.

The valve or control means 34 comprises a "lower" valve 46 and a "raise" valve 48, both preferably of the poppet type. These, along with portions of the servo means 42 are shown somewhat schematically. An upright lever 50 that engages both valves 46 and 48 is pivoted intermediate its ends at 52 to the tractor and is biased by a tension spring 54. The hand or "raise and lower" lever 40 is pivoted to the tractor at 56 and has a radially offset pivot 58 which rockably carries the intermediate portion of a second upright or operator lever 60 which has its upper end connected to the lever 50 by a link 62. The lower end of the lever 60 is pivoted at 64 to a force-transmitting means or link 66 at the forward end of which is a roller 68 that rides the rear arcuate surface or edge of a curved follower or lever 70.

The lower end L of the lever 70 is pivoted at 72 to the upper end of an elongated member 74 having a pivot at 76 to the tractor and a bifurcated lower end 78 straddling or otherwise associated with the mid-portion of the deflecting or distortable bar 24. A spring 80 biases the lever 70 in a clockwise direction so that the upper end D of the lever rides a cam fixed to the rockshaft 14. It is thus seen that as the rockshaft 14 turns, it acts through its cam to rock the lever 70 about its pivot 72 with the member 74, and as the member 74 swings in response to deflection of the bar 24, the lever 70 is rocked about its contact point with the rockshaft cam. Because movement of the lower end L of the lever 70 is a function of changes in implement or draft, it may be regarded as a load responder. Similarly, since the upper end D of the lever 70 moves in response to action of the cam and that in turn is responsive to the angular position of the rockshaft as the vertical position of the hitch 18 changes, such upper end D may be regarded as a depth or position responder. Whether the valve means 34 responds to either of these depends upon the setting of the selector lever 44, pivoted to the tractor at 82 and connected at 84 to the link 66 so that rocking of the lever 44 clockwise raises the roller end of the link 66 to the upper end D of the lever 70 (dotted lines, FIG. 2). This gives depth or position control; i.e., the "raise" and "lower" lever 40 is rocked to, say, lower the implement, and, as the implement lowers, the rockshaft 14 turns counterclockwise and the cam moves the lever 70 and link 66 rearwardly to reset the valve means 34 to neutral. Thus, the position of the implement is proportional to the amount of angular movement of the hand lever 40. To initiate such lowering of the implement, the hand lever 40, rocked counterclockwise, acts through the lever 60 and link 62 to rock the lever 50 clockwise about its pivot 52 to open the "lower" valve 46, thus exhausting fluid from the hydraulic motor (not shown) and allowing the hitch and implement to descend. As the rockshaft 14 turns counterclockwise, the cam, acting through upper end D of the lever 70 and link 66 in a rearward direction, returns the lever 50 in a clockwise direction and allows the poppet valve 46 to close. The "raise" valve 48 is not affected.

When the selector lever 44 is in the position shown (rocked counterclockwise from its "depth" position), the link 84 moves the link 66 to its lower position and the roller 68 engages the lower end L of the lever 70. This produces draft or load control so that the initial "lower" setting of the hand lever 40 determines an operating depth or load at which the implement operates unless changes in draft load occur. For example, assuming that the implement is plowing at maximum depth according to FIG. 2 (full lines), an increase in draft load will cause tensional forces in the lower links 28 to pull back on the outer ends of the distortable bar 24, causing forward deflection of the mid-portion of the bar and thus counterclockwise rocking of the lever 74, with a consequent rearward movement of the end L of the lever 70 and followed of course by rearward movement of the link 66, resulting in clockwise rocking of the lever 60, imparting, through the link 62, a clockwise rocking of the lever 50 to open the "raise" valve 48, which supplies fluid under pressure to the rockshaft motor (not shown), causing the implement to raise until the draft load is again "balanced" against the force of the "spring" or bar 24.

The above operation is, broadly, typical of that achieved in U.S. Pat. Nos. 2,921,638 and 2,940,530. As will be seen, if the plow is operating at a depth less than full depth, conditions may occur during operation whre the lower draft links 28 are placed in compression; e.g., when the plow suddenly finds little or no "support" from the ground beneath it, in which event deflection of the mid-portion of the bar will be to the rear and the consequent servo action will open the "lower" valve 46 until the plow finds equilibrium.

One instance in which the plow finds itself without "ground support" will occur when the plow is raised for transport; i.e., it is clear of the ground and its weight will signal a compressive load through the draft links 28 to the bar 24 and thus to the servo means 42 and valve means 34. This of course "informs" the control system that the plow must be lowered, which is contrary to the operator's intention. As noted previously herein, previous attempts have been to stop deflection of the bar 24 or to stop movement of a part connected directly to the valve means, but these have, for reasons stated, proven unsatisfactory, primarily in a system having a "selector" system for choosing between "load" and "depth" control.

According to the present invention, the disadvantages are eliminated by the provision of one-way stop means cooperative between a fixed part of the tractor structure and the force-transmitting means, here the link 66, because it is the link 66 that is the main component in selecting between "load" and "depth" control.

Thus, the stop means is effective in "load" control but not in "depth" or "position" control.

The stop means is indicated as a whole at 86 and includes a fixedly positioned stop 88 attached to the link 66 and an adjustable stop 90 carried by a wall 92 of the housing 12. As best seen in FIG. 3, the stop 88 is securely fastened, as by a rivet 94, to the link 66 and has a lug 96 engaging the link to prevent rotational movement of the stop. The stop 88 has an arcuate front edge 98 formed about the pivot 64 and this edge is engageable at times with an eccentric portion 100 integral with the inner end of a transverse element 102 rotatably mounted in a tubular carrier 104 which has an inner, externally threaded end 106 threaded into an internally threaded opening 108 in the housing wall 92. The element 102 fits snugly with the inner portion of the carrier 104 and a lubricant or contaminant seal is provided at 106. The carrier has an interior radial shoulder 112 and the exterior portion of the element 102 has a stop in the form of a snap ring and washer combination 114, between which and the shoulder 112 a coiled compression spring 116 acts to afford friction means for maintaining the angular setting of the element relative to the carrier 104. The exterior end of the element has a slot 118 for receiving a tool, such as a screw driver, for rotating the element 102 to change the eccentricity of the portion 100 and thus to alter the position at which the link stop 88 will engage the portion 100.

As applied specifically to the disclosure at hand, the movement of the link 66 is along a fore-and-aft path. The stop means 86 is effective to limit this movement in one direction; namely, forwardly. The element 102 is transverse to this path and thus interposes its eccentric portion as an abutment to engage the link stop 88 to interdict forward movement of the link, which forward movement of the link occurs as a result of the tendency of the hitch and implement to lower. As a result, when the hitch and implement are raised to transport and the weight of the implement signals a lowering condition, which is unwanted, the link 66 cannot move forwardly and thus the raised implement cannot "automatically" lower.

During normal operation, especially when the implement is operating at less than maximum depth, the stops 88 and 100 will be spaced apart; i.e., the link 66 may have a limited amount of movement relative to the stop 100 to accommodate expected "negative" sensing. When the selector lever 44 is rocked clockwise to "depth" or "position" control, the link 66 is raised clear of the fixed stop 100 (dotted lines, FIG. 2), and it is for this reason that the arcuate edge 98 is provided on the stop 88; i.e., so that the stop 88 may easily clear the stop 100. The adjustability of the stop means enables setting of the stop means to take care of tolerances in original manufacture or as occur following extended operation. Furthermore, adjustability may be easily achieved from the exterior of the housing and no complications by way of disassembly etc. are required. The friction means holds the stop means in its selected position of adjustment. The seal 110 is important because the interior of the housing contains relatively precision parts and lubricant therefor.

I claim:

1. A tractor power system for adjusting a tractor-connected implement, including tractor structure, a power unit, operator means for controlling the power unit, a depth responder movable by the power unit in accordance with adjustment of the implement, a load responder movable by the implement in accordance with changes in implement working load, means for operating the operator means, and a force-transmitting means connected to the operating means and selectively settable in a first position for movement back and forth by the depth responder or in a second position for movement back and forth by the load responder, characterized in that one-way stop means is engageable between the tractor structure and the force-transmitting means when the force-transmitting means is in its second position for limiting movement of the force-transmitting means in one direction.

2. The invention defined in claim 1, further characterized in that the stop means includes a first abutment on the force-transmitting means and a second abutment on the tractor structure, and means for adjusting one of the abutments along the path of movement of the force-transmitting means.

3. The invention defined in claim 2, further characterized in that the adjusting means is accessible exteriorly of the tractor structure.

4. The invention defined in claim 2, further characterized in that the tractor structure includes a housing wall enclosing the actuator, responders and force-transmitting means, the first abutment is fixed to the force-transmitting means, and the second abutment is carried by the housing wall for adjustment relative to the first abutment along the path of movement of the force-transmitting means.

5. The invention defined in claim 4, further characterized in that the second abutment includes an element projecting through and rotatably carried by the housing wall and having inner and outer ends respectively interiorly and exteriorly of the wall, the inner end has a stop portion eccentric with respect to the rotational axis of the element and the outer end has a tool-receiving portion to enable rotative adjustment of the element.

6. The invention defined in claim 5, further characterized in that friction means is provided for releasably retaining the selected adjusted positions of the element.

7. The invention defined in claim 6, further characterized in that the housing wall has an opening therethrough, a tubular carrier is mounted in the opening and the element is coaxially carried by the carrier and the friction means cooperates between the carrier and the element.

8. The invention defined in claim 7, further characterized in that the carrier has an internal shoulder, the element has an outer stop spaced axially from the shoulder and the friction means includes a resilient means acting between said last named stop and the shoulder.

9. The invention defined in claim 7, further characterized in that the housing wall opening is internally threaded and a portion of the carrier is externally threaded and screwed into the opening.

10. The invention defined in claim 7, further characterized in that a contaminant seal is provided between the carrier and element.

* * * * *